United States Patent
Powell et al.

(10) Patent No.: US 7,404,354 B2
(45) Date of Patent: Jul. 29, 2008

(54) ROTISSERIE DIVERTER PAN

(75) Inventors: Brian C. Powell, Dover, DE (US); Margaret A. Smith, Dover, DE (US)

(73) Assignee: Metal Masters Foodservice Equipment Co., Inc., Clayton, DE (US)

( * ) Notice: Subject to any disclaimer, the term of this patent is extended or adjusted under 35 U.S.C. 154(b) by 593 days.

(21) Appl. No.: 11/150,681

(22) Filed: Jun. 10, 2005

(65) Prior Publication Data
US 2006/0278211 A1 Dec. 14, 2006

(51) Int. Cl.
*A47J 37/00* (2006.01)

(52) U.S. Cl. ...................... 99/421 H; 99/419

(58) Field of Classification Search .............. 99/339, 99/419–421 V; 126/1 R, 25 R, 30; 218/400
See application file for complete search history.

(56) References Cited

U.S. PATENT DOCUMENTS

| | | | |
|---|---|---|---|
| 4,810,856 A * | 3/1989 | Jovanovic ............ 219/401 |
| D349,419 S | 8/1994 | Koopman | |
| 5,429,042 A | 7/1995 | Koopman | |
| 5,918,534 A * | 7/1999 | Medina ................ 99/342 |
| 6,009,797 A * | 1/2000 | Lin ...................... 99/421 H |
| 6,536,334 B2 * | 3/2003 | Backus et al. ......... 99/421 H |
| 6,568,316 B1 * | 5/2003 | Backus et al. ......... 99/421 H |

* cited by examiner

*Primary Examiner*—Sang Y Paik
(74) *Attorney, Agent, or Firm*—Connolly Bove Lodge & Hutz LLP

(57) ABSTRACT

A rotisserie arrangement comprises a spit rod, a diverter pan and a ring assembly. The spit rod includes a single projecting pin at one end thereof and a pair of projecting pins at the other thereof. The diverter pan includes a bottom wall with upwardly extending side and end walls, and each end wall includes a hook portion. The ring assembly includes an annular groove and an end plate with a pair of spaced apart openings in the plate to receive the pair of pins on that end of the spit rod. The hook portions of the diverter pan hook over the single pin of the spit rod and the annular groove of the ring assembly. When the spit rod is secured to the spit wheels of a rotisserie, the diverter pan remains bottom wall down during rotisserie rotation.

4 Claims, 4 Drawing Sheets

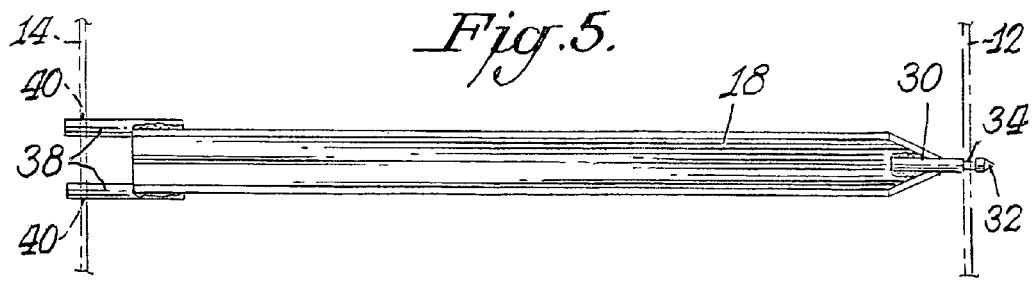
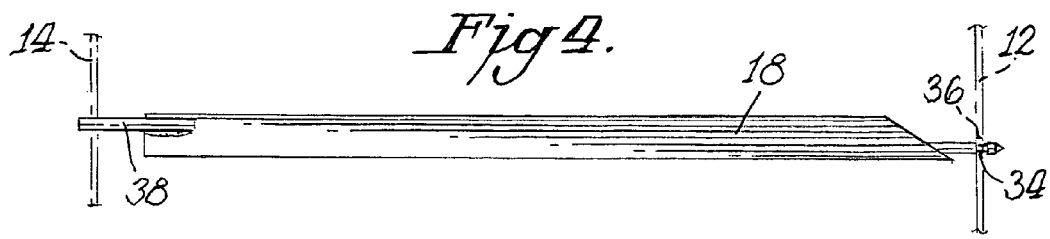
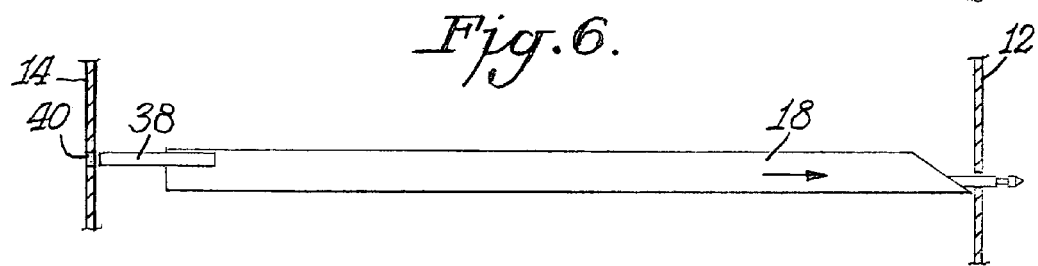
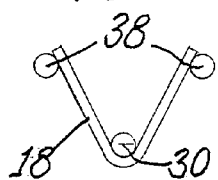
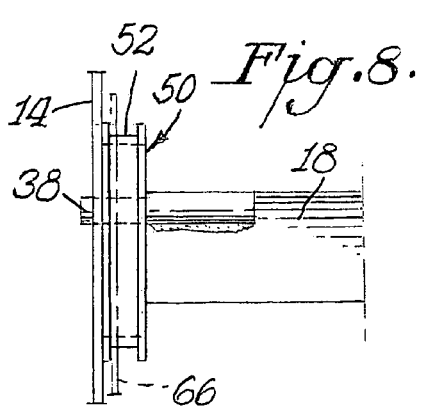
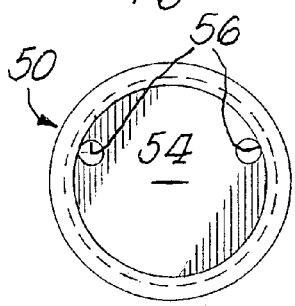

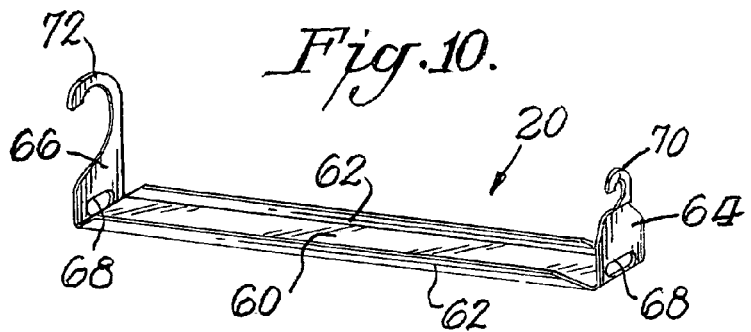
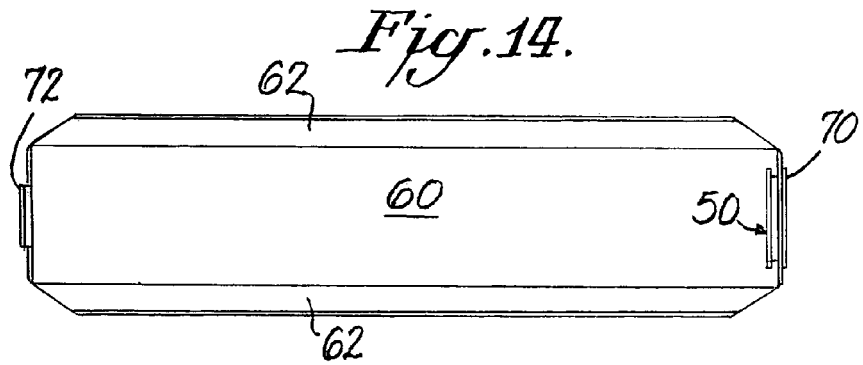
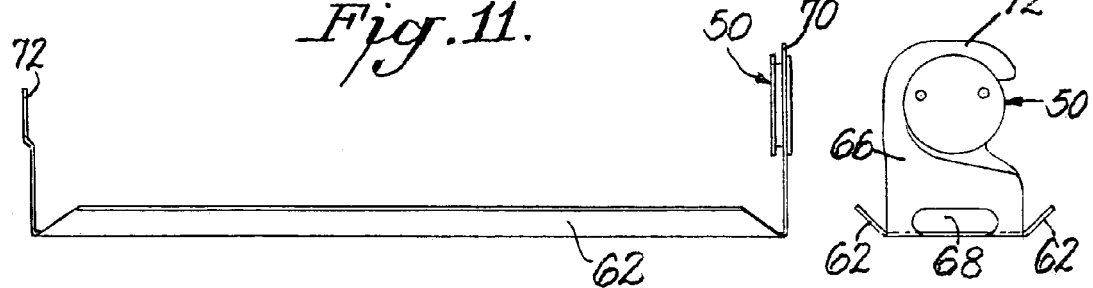
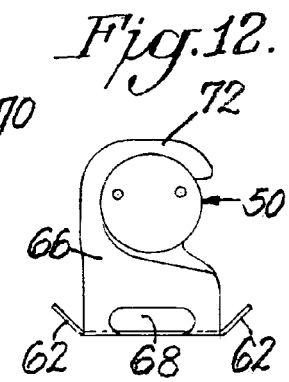
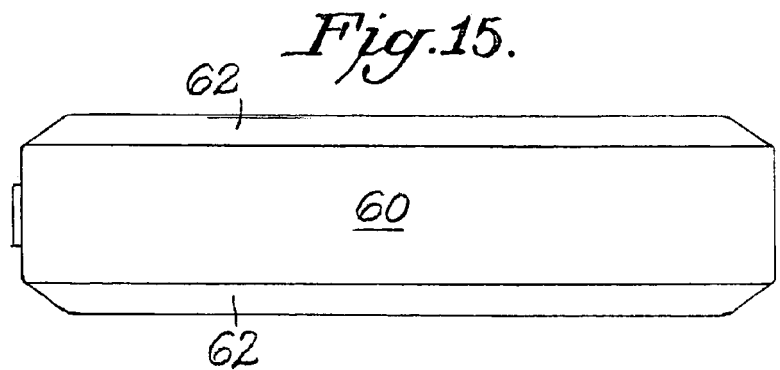
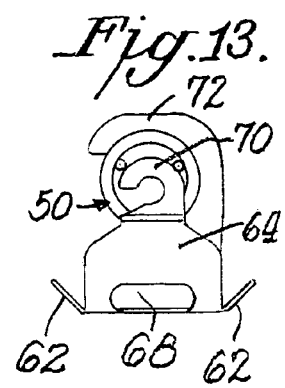

US 7,404,354 B2

ROTISSERIE DIVERTER PAN

BACKGROUND OF THE INVENTION

The present invention relates to a diverter pan for placement under a spit rod in a rotisserie for the purpose of collecting and diverting the drippings from food product on the rod and thereby prevent intermingling of the drippings from one rod to the adjacent rods of the rotisserie.

Many commercially available rotisseries include a pair of spaced apart spit wheels that rotate in a heated environment for the purpose of cooking food products. Individual spit rods holding meat, poultry and the like are fitted to and between the peripheral regions of the spit wheels. In some instances the spit wheels include openings in the peripheral regions thereof that receive outwardly projecting pins at opposite ends of the spit rods. One particular rod includes a single axially oriented projecting pin at one end thereof and a pair of similar axially oriented projecting pins at the other end thereof. The single pin may include a bullet shaped end an annular undercut or groove that mates with the spit wheel when the rod is positioned between the wheels.

After the spit rods are loaded with meat, poultry and the like, the single pin at one end thereof with the bullet shaped end is pushed into and through a receiving opening on one of the spit wheels of the rotisserie. Initial insertion is such that the annular groove in that pin moves past the spit wheel. Next, the pair of spaced apart pins at the opposite end of the spit rod are fitted into receiving openings in the other spit wheel. The pair of pins is inserted until the annular groove on the single pin registers with the spit wheel to which it is attached. This three point connection of the spit rod to the spit wheels of the rotisserie prevents any relative movement between the rod and wheels as the wheels rotate during the cooking process. Also, registration of one of the spit wheels with the annular groove of the single pin prevents lateral movement of the rod relative to the wheels.

It has now been proposed to simultaneously cook food products with different seasonings and the like in a commercial rotisserie, but in order to do so it is important to insure that the drippings from the food on one spit rod do not fall onto and intermingle with the differently flavored food on the adjacent spit rods of the rotisserie.

SUMMARY OF THE INVENTION

In accordance with the present invention, a diverter pan has been proposed for placement under each spit rod for receiving and diverting food drippings away from the food on an adjacent spit. It is important that these diverter pans remain bottom side down during rotation of the spit wheels and therefore the rods must rotate relative to the pans. The pans orbit with the spit wheels, but remain bottom side down.

Normally it would be easy to simple hook the ends of a diverter pan over the spit rod so that the rod is free to rotate relative to the pan. However, with two projecting pins at one end of the rod it is impossible to simply hook that end of the pan over the two pins. Special treatment is required.

The diverter pan of the present invention has a bottom wall with upwardly extending side and end walls. Each end wall includes a hook portion and a lower opening that allows liquids captured by the bottom wall to flow out of the end of the pans. The hook at one end of the pan simply hooks over the single projection pin at one end of the spit rod.

A ring assembly is required at the other end of the spit rod where the pair of pins are located. The ring assembly includes an outer pulley like groove and an end plate with two spaced apart openings arranged to receive the two pins at that end of the spit rod. The other hook end of the diverter pan simply hooks over the groove in the ring assembly. In use, the two pins on that end of the spit rod extend through the two openings in the end plate of the ring assembly and then the pins pass onto the receiving openings of the spit wheel of the rotisserie. The end hooks on the diverter pan hook over the single pin of the spit rod and over the annular groove of the ring assembly.

BRIEF DESCRIPTION OF THE DRAWINGS

Novel features and advantages of the present invention in addition to those mentioned above will become apparent to persons of ordinary skill in the art from a reading of the following detailed description in conjunction with the accompanying drawings wherein similar reference characters refer to similar parts and in which:

FIG. 4 is a side elevational view of a spit rod releasably secured to the spit wheels of a rotisserie;

FIG. 5 is a top plan view of the spit rod of FIG. 4;

FIG. 6 is a side elevational view similar to FIG. 4, but illustrating the single projection pin on the right end of the spit rod fully inserted into a receiving opening in the right spit wheel of the rotisserie so that the pair of pins on the left end of the spit rod may be inserted into receiving openings in the left spit wheel of the rotisserie;

FIG. 7 is a end view of the spit rod illustrating the single projecting pin on one end of the rod and the pair of pins on the other end of the rod;

FIG. 8 is a fragmental side elevational view of the ring assembly for receiving the pair of pins at the left end of the spit rod;

FIG. 9 is a front elevational view of the ring assembly, in accordance with the present invention;

FIG. 10 is a perspective view of the diverter pan, in accordance with the present invention;

FIG. 11 is a right side elevational view of the diverter pan and ring assembly;

FIG. 12 is a rear elevational view of the diverter pan and ring assembly;

FIG. 13 is a front elevational view of the diverter pan and ring assembly;

FIG. 14 is a top plan view of the diverter pan and ring assembly; and

FIG. 15 is a bottom plan view of the diverter pan and ring assembly.

DETAILED DESCRIPTION OF THE INVENTION

Figure 1:
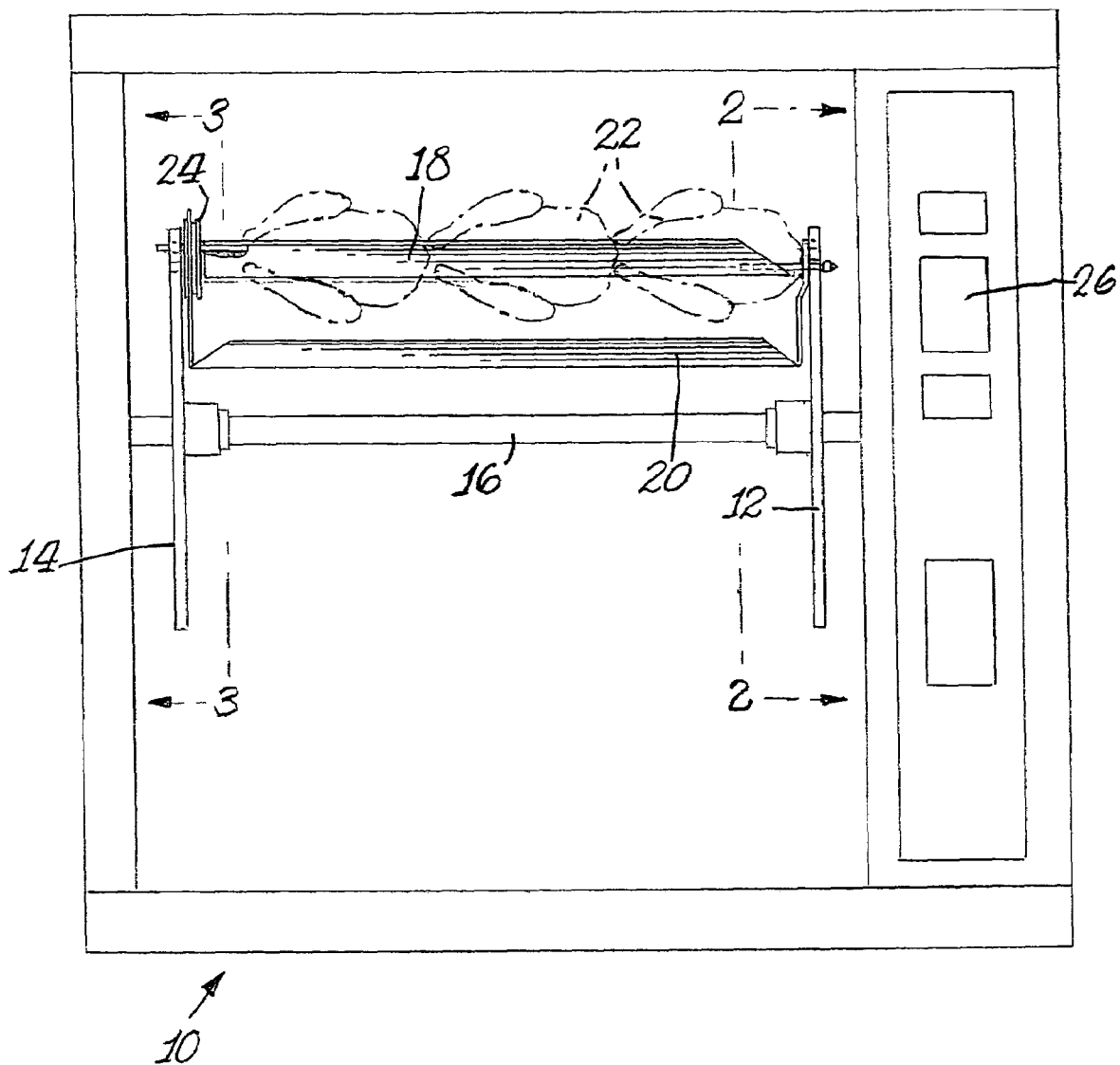
FIG. 1 is a front elevational view of a rotisserie with the door removed illustrating one spit rod mounted to the spit wheels of the rotisserie with a diverter pan under the rod, in accordance with the present invention.
Figure 2:
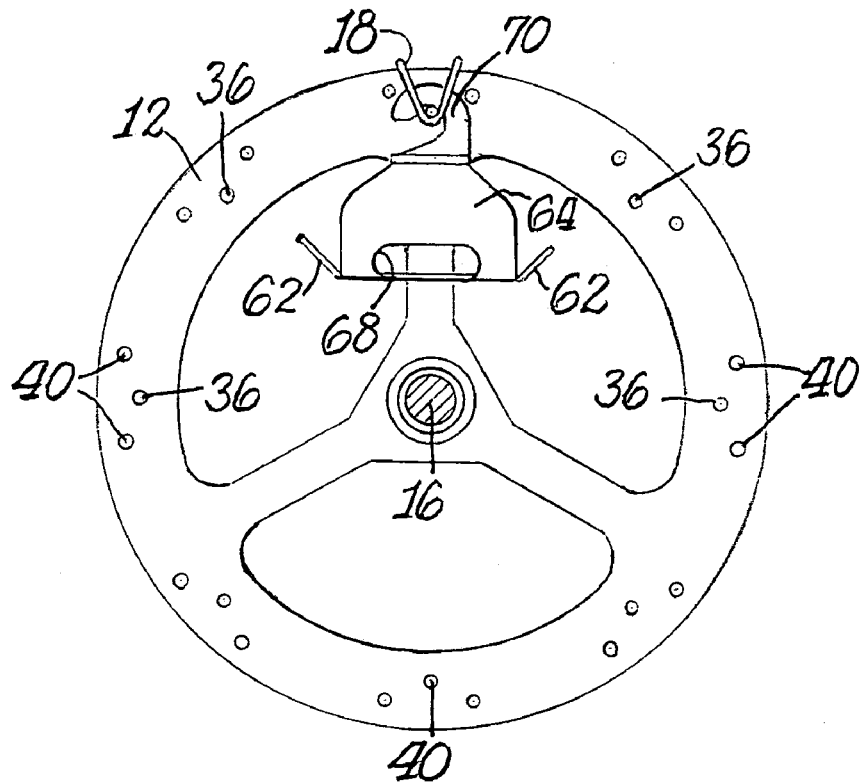
FIG. 2 is a sectional view taken along line 2-2 of FIG. 1.
Figure 3:
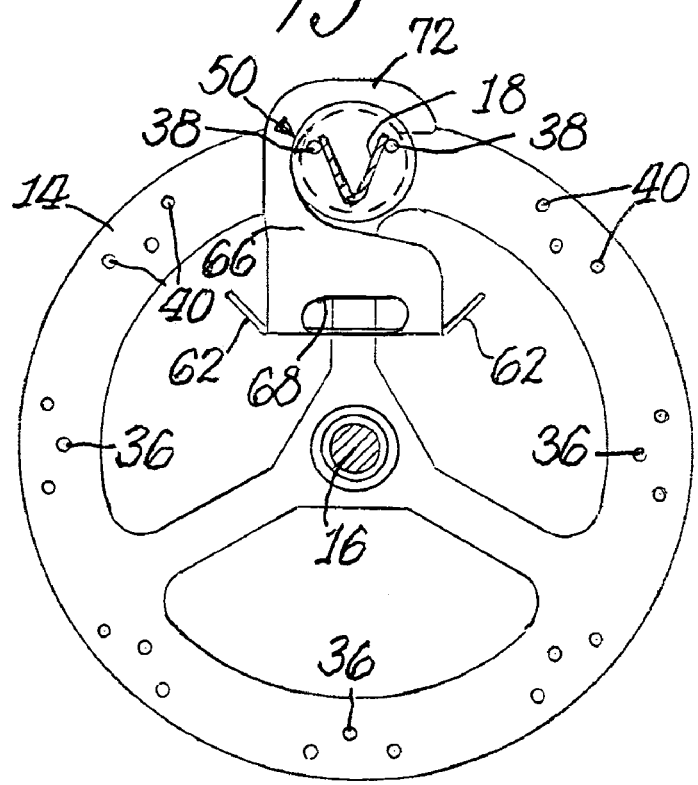
FIG. 3 is a sectional view taken along line 3-3 of FIG. 1.

Referring in more particularity to the drawings, FIG. 1 illustrates portions of a rotisserie 10 including a pair of spaced apart spit wheels 12, 14 connected to a drive shaft 16 for rotation within the rotisserie. A single spit rod 18 is positioned between the spit wheels 12, 14, and as described more fully below, the spit rod is connected to the wheels by three point contact to prevent any relevant movement of the spit rod with respect to the wheels. A diverter pan 20 is connected under the spit rod for collecting and diverting drippings from food products on the rod such as poultry 22, for example. A ring assembly 24 cooperates with the left end of the spit rod to facilitate connection of the diverter pan, as explained more fully below. Controls 26 for the rotisserie are diagrammatically illustrated.

The rotisserie 10 of FIG. 1 may be of the type shown in Des. 349,419, granted Aug. 9, 1994, and assigned on its face to Henny Penny Corporation of Eaton, Ohio. This design is incorporated herein in its entirety.

As shown best in FIGS. 2-6, the spit rod 18 includes a single axially orientated projecting pin 30 at one end thereof. Pin 30 includes a bullet shaped end 32 and an annular undercut or groove 34. In use, pin 30 is positioned within a receiving opening 36 in the right spit wheel 12 and the groove 34 registers with the opening 36.

The left end of the spit rod 18 includes a pair of axially oriented projecting pins 38 that fit into receiving openings 40 in the left rotisserie wheel 14. This three pin connection between the projecting pins 30, 38 and the spit wheels 12, 14 prevents any movement of the spit rod 18 relative to a spit wheels.

Insertion and removal of the spit rod 18 between the spit wheels 12, 14 is easily accomplished by initially inserting the single projecting pin 30 through the receiving opening 30 in the right spit wheel 12 so that the undercut or annular groove 34 moves past the spit wheel. This enables the pins 38 at the other end of the spit rod to clear the left wheel 14. Reverse movement of the spit rod to the left then positions the pins 38 in the receiving openings 40 of the left spit wheel 14 and also results in registration of the undercut 34 with the right spit wheel 12.

The present invention also includes a ring assembly 50 having a pulley like annular groove 52 on the outside thereof. As explained more fully below, this groove receives one of the hook ends of the diverter pan 20. Moreover, as shown in FIGS. 8 and 9, the ring assembly also includes an end plate 54 with spaced apart openings 56 in the end plate. The spacing of these openings is the same as the spacing between the projecting pins 38 and also the spacing between the receiving openings 40 in the left spit plate 14.

Accordingly, with the rotisserie 10 and the spit rods 18, it is possible to place a diverter pan under each rod by utilizing the ring assembly 50. The pair of projecting pins 38 of the spit rod 18 simply extend through the openings 56 in the end plate 54 of the ring assembly before passing into the openings 40 in the left spit wheel 14.

As explained more fully below, the diverter pan 20, has hook ends and one end simply hooks over the single projecting pin 30 of the spit rod while the other hook end of the pan hooks over the pulley like annular groove 52 of the ring assembly. Such connection enables the spit rod to rotate relative to the diverter pan as the spit wheels rotate during rotisserie operation and the diverter pan remains bottom wall down.

The diverter pan of the present invention is shown in detail in FIG. 10-15. In this regard the diverter pan 20 includes bottom walls 60 and upwardly extending side walls 62. End walls 64, 66 also extend upwardly from the bottom wall 60. Each end wall includes an opening 68 through which drippings collected on the diverter pan may be removed.

End wall 64 includes a hook portion 70 that simply hooks over the single pin 30 of the spit rod. The other end of the diverter pan also includes a hook portion 72, but the hook is slightly larger in order to hook over the annular groove 52 of the ring assembly 50. With this type of connection, the diverter pan remains bottom side down during rotation of the spit wheels 12, 14 while the spit rods remain fixed to the wheels.

The diverter pan 20 and the ring assembly 50 of the present invention enable utilization of the rotisserie 10 to simultaneously cook foods having different flavorings without intermingling of those flavorings between the food on different spit rods. In rotisseries having positions for eight spit rods it may be necessary to remove every other rod to accommodate the diverter pans so that only four rods each with a diverter pan are connected to the spit wheels. However, with a diverter pan 20 positioned below each spit rod, drippings from the poultry 22 on one rod are deposited onto the diverter pan rather onto than the poultry on an adjacent rod. These drippings simply collect on the bottom wall 60 of the diverter pan 20 and empty away from the ends of the pan through the openings 68 in the end walls 64, 66.

The ring assembly 50 enables use of a diverter pan even through the left end of the spit rod 18 includes two projecting pins 38.

We claim:

1. A rotisserie arrangement comprising a spit rod, diverter pan and ring assembly, the spit rod including a single projecting pin at one end thereof and a pair of spaced apart projecting pins at the other end thereof, the diverter pan including a bottom wall with upwardly extending side and end walls, each end wall including a hook portion, and the ring assembly including a annular groove and an end plate with a pair of spaced apart openings in the end plate constructed and arranged to receive the pair of spaced apart pins on that end of the spit rod whereby the hook portion at one end of the diverter pan hooks over the single projecting pin at one end of the spit rod while the hook portion at the other end of the diverter pan hooks over the annular groove of the ring assembly.

2. A rotisserie arrangement as in claim 1 wherein at least one of the end walls of the diverter pan includes an opening for removing any liquids collected on the diverter pan.

3. A rotisserie arrangement as in claim 1 wherein each end wall of the diverter pan includes an opening for removing any liquids collected on the pan.

4. A rotisserie arrangement as in claim 1 in combination with a rotisserie having a pair of spit wheels with openings therein constructed and arranged to receive the projecting pins on the spit rod.

* * * * *